US006404707B1

(12) United States Patent
Kaneda et al.

(10) Patent No.: US 6,404,707 B1
(45) Date of Patent: Jun. 11, 2002

(54) STORAGE APPARATUS USING REMOVABLE MEDIA AND ITS READ/WRITE CONTROL METHOD

(75) Inventors: Yasunori Kaneda, Sagamihara; Teruo Noro, Hadano; Kenji Tokumitsu, Odawara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/489,025

(22) Filed: Jan. 21, 2000

(30) Foreign Application Priority Data

Jan. 25, 1999 (JP) .......................................... 11-015210

(51) Int. Cl.[7] .............................................. G11B 17/22
(52) U.S. Cl. .................................... 369/30.06; 369/30.2
(58) Field of Search ............................. 369/34, 30, 33, 369/36, 37, 38, 39, 178

(56) References Cited

U.S. PATENT DOCUMENTS

| | | | | |
|---|---|---|---|---|
| 5,633,842 A | * | 5/1997 | Nishida et al. ................ 369/32 |
| 5,657,301 A | * | 8/1997 | Yoshikawa et al. ........... 369/30 |
| 5,802,020 A | * | 9/1998 | Kaneko et al. ................ 369/34 |
| 5,831,947 A | * | 11/1998 | Okazaki et al. ............... 369/34 |
| 6,064,635 A | * | 5/2000 | Machiguchi .................. 369/34 |
| 6,118,738 A | * | 9/2000 | Uehara ......................... 369/34 |
| 6,201,771 B1 | * | 3/2001 | Otsuka et al. ................. 369/30 |

OTHER PUBLICATIONS

"Special Topic I: A Growing DVD World", Toshiba Review 2, 1998, vol. 53, No. 2.

* cited by examiner

*Primary Examiner*—Tan Dinh
(74) *Attorney, Agent, or Firm*—Mattingly, Stanger & Malur, P.C.

(57) ABSTRACT

There has been disclosed a storage apparatus comprising a plurality of drive units each for writing and reading out data into and from a removable storage medium a transport unit for transporting a storage medium between a plurality of slots for accommodating storage mediums and the driving units and a control unit for controlling transportation of a storage medium by the transport unit.

The control unit controls the transport unit in accordance with a command issued by a computer connected to the storage apparatus, setting a storage medium in a drive unit. The drive unit writes and reads out data into and from the storage medium in accordance with a parameter determined for a combination of the drive unit and the storage medium.

16 Claims, 11 Drawing Sheets

| bit offset | MSB 7 | 6 | 5 | 4 | 3 | 2 | 1 | LSB 0 |
|---|---|---|---|---|---|---|---|---|
| 0 | START STOP UNIT COMMAND = 1BH ||||||||
| 1 | RESERVED ||||||| Immed |
| 2 | RESERVED ||||||||
| 3 | RESERVED ||||||||
| 4 | RESERVED |||||| LOAD/ EJECT | START /STOP |
| 5 | STP | RESERVED ||||| Flag | Link |

STP : START UP PARAMETER BIT

| bit<br>offset | MSB<br>7 | 6 | 5 | 4 | 3 | 2 | 1 | LSB<br>0 |
|---|---|---|---|---|---|---|---|---|
| 0 | colspan="8" | Environment temperature |||||||
| 1 | colspan="8" | Read-operation laser output |||||||
| 2 | colspan="8" | Write-operation laser output |||||||
| 3 | colspan="8" | Servo-position correction value |||||||
| 4<br>:<br>15 | MSB<br><br>Drive name<br><br>LSB |||||||
| 16<br>:<br>31 | MSB<br><br>Drive identification number<br>(Such as manufacturing serial number)<br><br>LSB |||||||

STORAGE APPARATUS USING REMOVABLE MEDIA AND ITS READ/WRITE CONTROL METHOD

BACKGROUND OF THE INVENTION

The present invention relates to a storage apparatus using a removable medium and its read/write control method. More particularly, the present invention relates to a method of shortening a mount time between mounting of a storage medium on the storage apparatus and a state in which data can be written into and read out from the storage medium.

Storage apparatuses employed in a computer system can be classified into 2 main categories. A storage apparatus in one of the categories is referred to as a removable-storage medium storage apparatus allowing a storage medium used therein to be mounted on and demounted from a drive which includes a driving mechanism, a read/write head, a control circuit and a signal processing circuit. On the other hand, a storage apparatus in the other category is known as an unremovable-storage medium storage apparatus disallowing a storage medium used therein to be mounted on and demounted. Examples of storage apparatuses in the first category are a floppy-disk drive apparatus, a magneto-optical-disc drive apparatus, a CD-ROM (Compact Disc Read Only Memory) drive apparatus and a DVD (Digital Versatile Disc) drive apparatus. An example of a storage apparatus in the other category is an HDD (Hard Disk Drive).

In recent years, the capacity of the storage device has been increasing to accompany improvements of the performance of the computer system. For example, while the storage capacity of an ordinary floppy disk is only 1.44 MB, that of a magneto optical disc is 640 MB and a DVD-RAM drive is capable of making an access to a DVD-RAM having a storage capacity of 2.6 GB on one surface. In particular, the DVD-RAM drive is not only capable of making an access to a DVD-RAM, but also compatible with storage media such as a DVD-ROM, a DVD video medium, a CD-ROM, a CD-R, a CD-RW, as well as audio and video CDs as described in an article entitled "Special Topic I: A Growing DVD World" in a technical magazine Toshiba Review 2, 1998, Vol. 53 NO. 2. The DVD-RAM drive is expected to be a popular and widely used future standard removable storage apparatus in the future.

Since ordinary use of a removable-storage-medium storage apparatus should not be limited to combinations of specific drive manufacturers and storage medium makers, it is necessary to keep the apparatus compatible with all manufacturers. For example, it is necessary for a drive made by A company to be capable of making accesses correctly to storage media produced by C, D and E companies. In addition, a drive made by B company must be capable of reading data written into a storage medium manufactured by A company. In order to make the DVD-RAM drive compatible with different types of storage medium and drives made by other manufacturers, a variety of adjustments are carried out when a storage medium is inserted into or mounted on the drive. The adjustments include correction of the power of a read/write laser, temperature correction and head-position correction in order for the DVD-RAM drive to learn the characteristics of the other storage media. After the learning process, the DVD-RAM is capable of executing read and write commands issued by a host computer.

SUMMARY OF THE INVENTION

In the case of a DVD-RAM drive, it takes tens of seconds to learn characteristics of a storage medium thereof since the recording density of the medium is high. Results of learning are stored in a memory of the DVD-RAM drive. The memory is generally a part of a control circuit in the DVD-RAM drive. Learning parameters are deleted when the power is turned off. When a next storage medium is mounted on the DVD-RAM drive, however, new learning parameters are acquired. In this way, a learning process is carried out each time a storage medium is inserted into the DVD-RAM drive.

In addition, the DVD-RAM drive is scheduled to keep up with a capacity enhancement of the storage medium from 2.6 GB per surface (or a double-side recording capacity 5.2 GB) for the first generation to a single-side recording capacity in the range of 4.7 to 15 GB or even larger. It is therefore difficult to shorten the time it takes to learn characteristics of a storage medium at the time the medium is mounted thereon. For this reason, a technology for shortening the learning time is demanded.

It is thus an object of the present invention to provide a method of shortening a time between the mounting of a storage medium on a storage apparatus and a state in which data can be written into and read out from the storage medium. Such a time is referred to hereafter as a mount time.

In order to achieve the object described above, a storage apparatus according to an aspect of the present invention is provided with a drive unit used for writing and reading out data into and from a removable storage medium and characterized in that the drive unit controls operations to write and read out data into and from the medium in accordance with an external parameter. It is desirable to provide an external parameter for letting the drive unit adapt itself to the temperature of an environment in which the drive unit is operating.

According to another aspect of the present invention, there is provided a storage apparatus having a plurality of drive units. The storage apparatus further has a plurality of slots each used for accommodating a storage medium, a transport unit for conveying a storage medium between the slots and the drive units and a control unit for controlling the transportation of a storage medium between the slots and the drive units. It is desirable to provide a control unit having a memory for storing a parameter for controlling operations carried out by any of the drive units to write and read out data into and from a storage medium mounted thereon for each combination of any of the drive units and any of storage mediums accommodated in the slots. In such a configuration, the control unit transfers a parameter proper for a combination of a drive unit and a storage medium mounted thereon to the drive unit. A storage medium can be identified individually by the slot for accommodating the medium. As an alternative, a storage medium can be identified from identification information recorded on the medium or on an identification means provided on a tray on which the medium is mounted.

According to a still another aspect of the present invention, there is provided a computer system comprising a computer and a storage apparatus wherein the storage apparatus includes a plurality of drive units, a plurality of slots each used for accommodating a storage medium, a transport unit for conveying a storage medium between the slots and the drive units and a control unit for controlling the transportation of a storage medium between the slots and the drive units; whereas the computer has a parameter for controlling operations carried out by any of the drive units to write and read out data into and from a storage medium mounted thereon for each combination of any of the drive units and any of storage mediums accommodated in the slots.

When a storage medium is set in a specific one of the drive units, the computer supplies a parameter proper for a combination of the storage medium and the specific drive unit to the unit. Then, the drive unit carries out operations based on the parameter to write and read out data into and from the storage medium mounted thereon.

Other features and advantages of the present invention will be apparent from the description of the preferred embodiments and from the claims.

DESCRIPTION OF THE PREFERRED EMBODIMENTS

Figure 1:
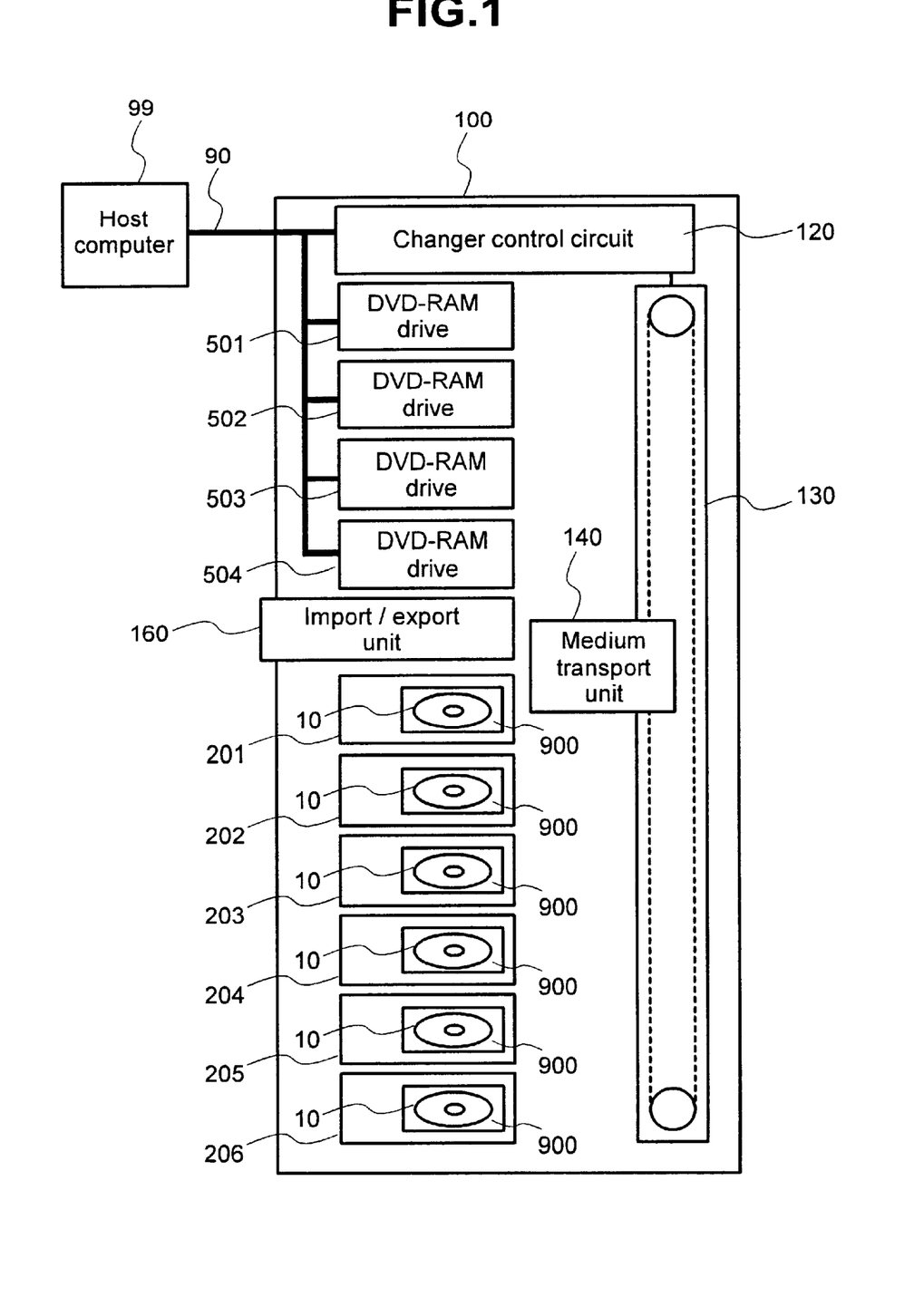
FIG. 1 is a block diagram showing the internal configuration of a changer apparatus implemented by a first embodiment of the present invention.

FIG. 1 is a block diagram showing the internal configuration of a changer apparatus implemented by a first embodiment of the present invention to serve as a storage apparatus to which the present invention is applied. As shown in the figure, the changer apparatus 100 includes 4 DVD-RAM drives 501 to 504, 6 slots 201 to 206 and 1 import/export unit 160. The DVD-RAM drives 501 to 504 are each referred to hereafter simply as a drive. In this embodiment, only 6 Slots are employed in order to make the explanation simple. It should be noted, however, that the number of slots is arbitrary. The slots 201 to 206 each have a tray 900 on which a DVD-RAM medium 10 can be mounted.

A DVD-RAM medium 10 is referred to hereafter simply as a medium 10. A changer control circuit 120 and the drives 501 and 504 are connected to a host computer 99 by an SCSI (Small Computer System Interface) 90. The changer control circuit 120 and the drives 501 to 504 are connected to each other in a daisy chain interconnection.

The changer apparatus 100 receives a request for a transport of a medium 10 from the host computer 99. In response to this request, a medium 10 is transported by using a vertically movable driving belt 130 and a medium transport unit 140 as follows. Assume that the changer control circuit 120 receives a request for a transport of a medium 10 from the slot 201 to the drive 501. In this case, the driving belt 130 is controlled to move the medium transport unit 140 to the slot 201 for accommodating a target medium 10 and to fetch the medium 10 from the slot 201. In the case of this embodiment, since each medium 10 is placed on a tray 900, the target medium 10 is fetched along with its tray 900. The changer control circuit 120 again controls the driving belt 130, moving the medium transport unit 140 to the destination drive 501 on which the target medium 10 held by the medium transport unit 140 is to be set.

Figure 2:
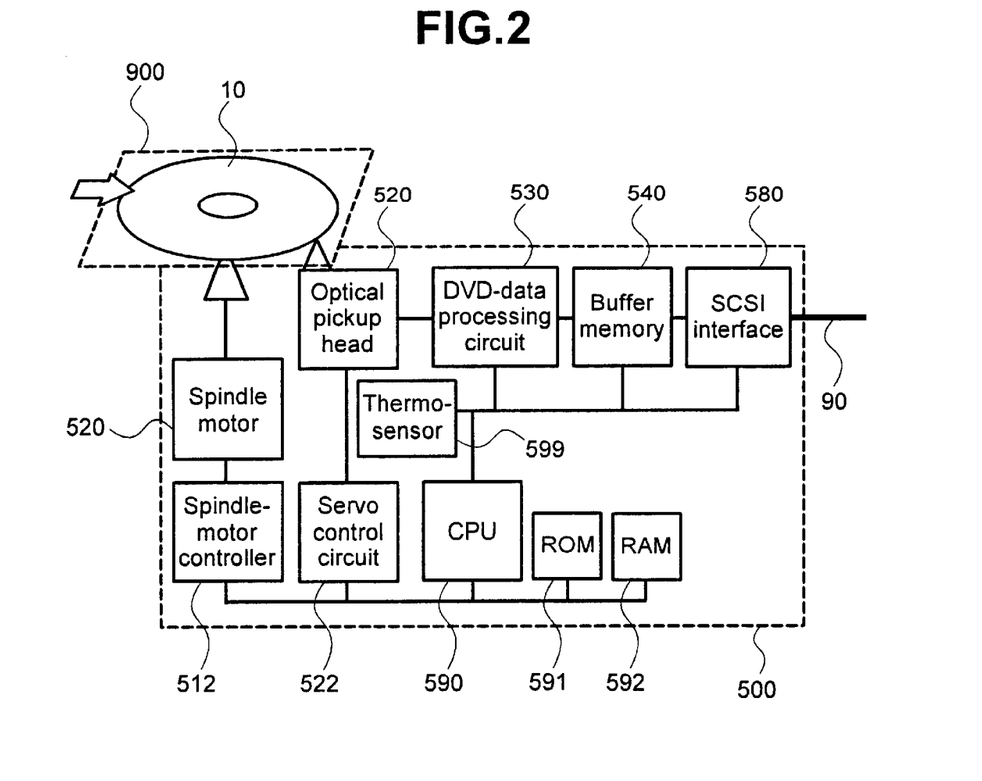
FIG. 2 is a block diagram showing the internal configuration of a drive provided by the first embodiment of the present invention.

FIG. 2 is a block diagram showing the internal configuration of a drive 500 provided by the first embodiment of the present invention. The drive 500 is one of the drives 501 to 504 shown in FIG. 1.

As shown in FIG. 2, the drive 500 includes a spindle motor 510, a spindle-motor control circuit 512, an optical pickup head 520, a servo control circuit 522, a DVD data processing circuit 530, an SCSI interface unit 580, a DVD-data processing circuit 530, a buffer memory 540 and a CPU (Central Processing Unit) 590. The spindle motor 510 is used for rotating a medium 10 mounted on the drive 500. The spindle-motor control circuit 512 is used for controlling the rotation of the spindle motor 510. The optical pickup head 520 is used for reading out and writing data from and into the rotating medium 10. The servo control circuit 522 is used for positioning the optical pickup head 520 at a destination location on the medium 10. The DVD-data processing circuit 530 is used for carrying out conversion of data to be written into the medium 10, signal processing on the data to be written into the medium 10, signal processing on data read out from the medium 10 and conversion of the data read out from the medium 10. The SCSI interface unit 580 is used for transferring data in accordance with a request received from the host computer 99 or the changer control circuit 120. The buffer memory 540 is used for absorbing a difference in processing speed between the DVD-data processing circuit 530 and the SCSI interface unit 580. The CPU 590 is used for controlling other members of the storage apparatus.

Programs to be executed by the CPU 590 are stored in a ROM (Read-Only Memory) 591. A RAM (Random-Access Memory) 592 serves as an area for temporarily storing data processed by the CPU 590.

Figure 3:
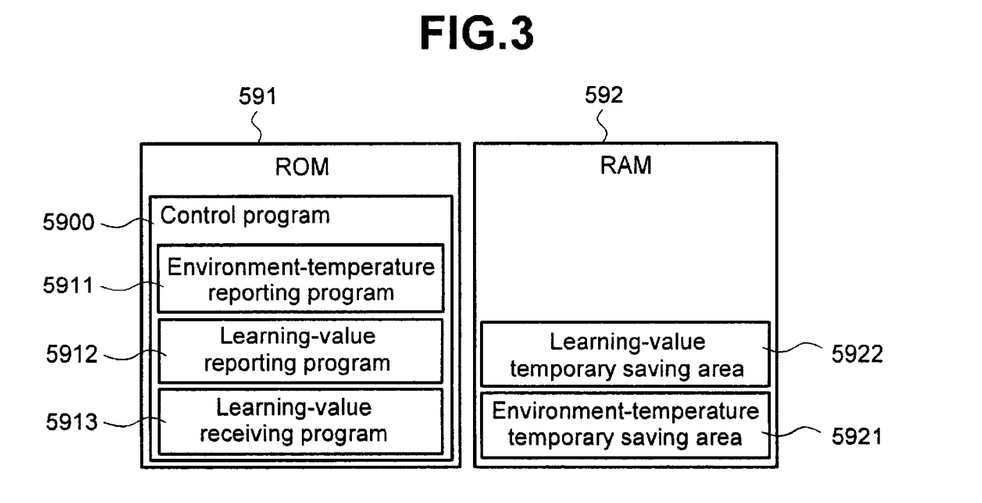
FIG. 3 is a modeling diagram showing the internal configurations of a ROM and a RAM employed in the drive.

FIG. 3 is a modeling diagram showing the internal configurations of the ROM 591 and the RAM 592. A drive control program 5910 to be executed by the CPU 590 is stored in the ROM 591. The drive control program 5910 includes an environment-temperature reporting program 5911, a learning-parameter reporting program 5912 and a learning-parameter receiving program 5913. The RAM 592 has a learning-parameter temporary saving area 5922 and an environment-temperature temporary saving area 5921.

In addition, the drive 500 further includes a thermo-sensor 599 for measuring the temperature of an environment surrounding the optical pickup head 520. The environment temperature measured by the thermo-sensor 599 is read out by the CPU 590 at fixed intervals and stored in the environment-temperature temporary saving area 5921 of the RAM 592. The CPU 590 reports an environment temperature stored in the environment-temperature temporary saving area 5921 to the host computer 99 in response to a REPORT TEMPERATURE COMMAND received from the host computer 99 through the SCSI interface unit 580. When the thermo-sensor 599 detects a temperature beyond a temperature range assuring the operation of the drive 500, a warning is given to the host computer 99. In a system adopting the SCSI interface, a temperature abnormality is reported as unit attention status.

The following description explains a processing sequence of driving the medium transport unit 140 to transport a medium 10 accommodated in any of the slots 201 to 206 to a target drive 501, 502, 503 or 504 and setting the medium 10 in the target drive 501, 502, 503 or 504 in a state of allowing data to be written into or read out from the medium 10.

The processing sequence is referred to hereafter as mount processing.

Figure 4:
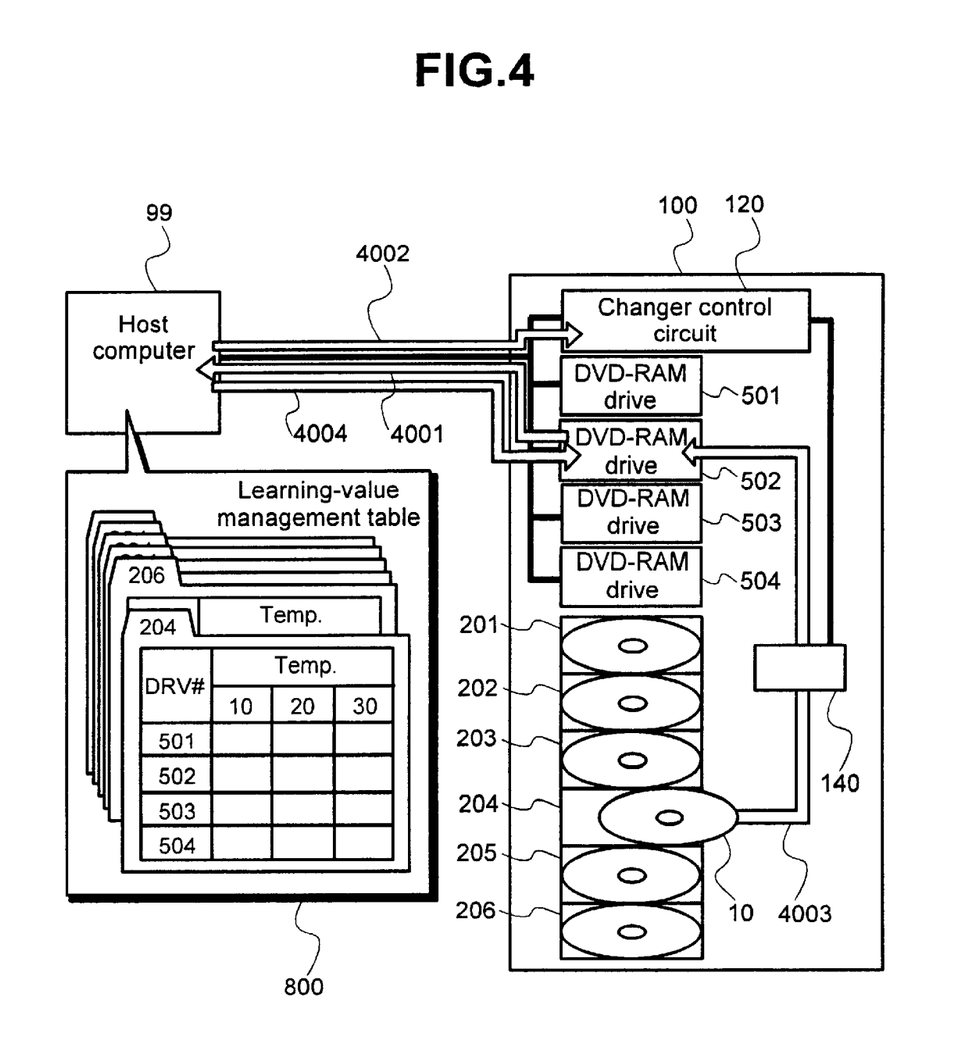
FIG. 4 is a modeling diagram showing a state of mount processing before acquiring learning parameters.
Figure 5:
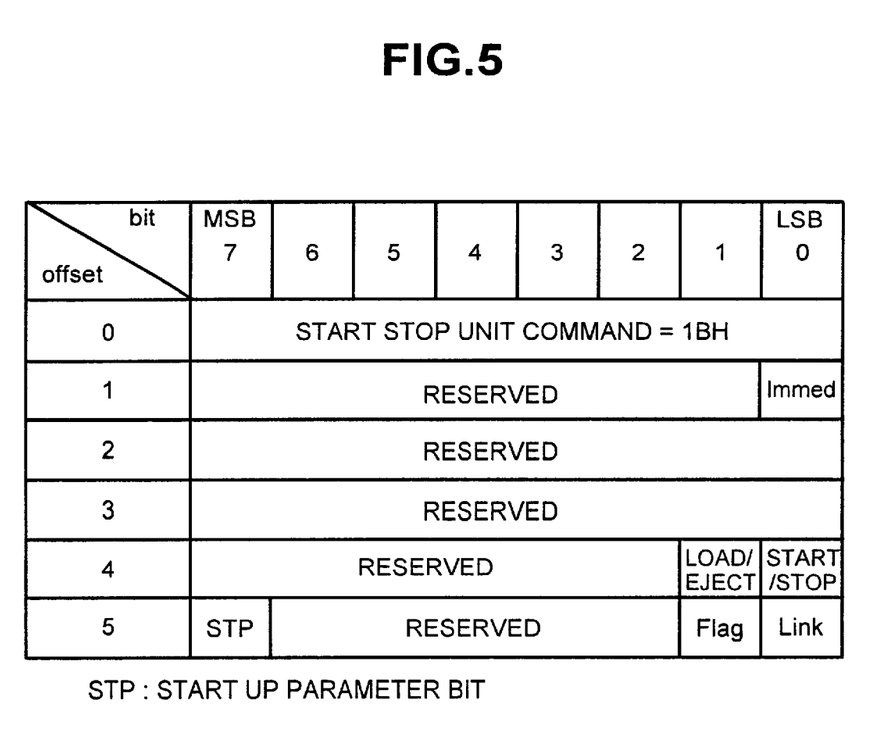
FIG. 5 is a diagram showing the format of a START STOP UNIT COMMAND.

FIG. 4 is a modeling diagram showing a state of mount processing before acquiring learning parameters. The host computer 99 has a learning-parameter management table 800 which includes two-dimensional matrixes for the slots 201 to 206. Each of the two-dimensional matrixes is used for holding learning parameters arranged in rows and columns corresponding to the numbers of the drives 501 to 504 and environment temperatures respectively. Assume that a medium 10 is transported from the slot 204 to the drive 502. In this case, the host computer 99 issues a REPORT-TEMPERATURE COMMAND to the drive 502 in order to acquire an environment temperature from the drive 502 as shown by an arrow 4001 in FIG. 4. In a learning process to be described later, if learning parameters have already been held in the learning-parameter management table 800, the host computer 99 then searches the learning-parameter management table 800 for a learning parameter corresponding to the environment temperature acquired from the drive 502. To put it in detail, the host computer 99 selects a two-dimensional matrix for the slot 204. Then, the host computer 99 determines the two-dimensional matrix's row and column corresponding to the drive 502 and the acquired temperature respectively, reading out a learning parameter from a cross point of the determined row and column. At this stage, however, learning parameters have not been held in the learning-parameter management table 800. Thus, no learning parameter is acquired from the learning-parameter management table 800. Instead, when learning parameters have not been held in the learning-parameter management table 800, the host computer 99 issues a MOVE COMMAND to the changer control circuit 120 as shown by an arrow 4002 in the figure to request the medium transport unit 140 to transport a medium 10 from the slot 204 to the drive 502. In accordance with this MOVE COMMAND, the changer control circuit 120 controls the medium transport unit 140 to transport the medium 10 from the slot 204 to the drive 502 as shown by an arrow 4003 in the figure. When a status response indicating completion of the execution of the MOVE COMMAND is received from the changer control circuit 120, the host computer 99 issues a START STOP UNIT COMMAND to the drive 502 as shown by an arrow 4004. A START/STOP bit and a LOAD/EJECT bit in the START STOP UNIT COMMAND are both set at 1 to request that rotation be started. A START UP PARAMETER bit is reset at 0 to indicate that no learning parameter can be provided by the host computer 99. FIG. 5 is a diagram showing the format of the START STOP UNIT COMMAND. As shown in the figure, the START STOP UNIT COMMAND is an extended command based on SCSI specifications. Immed, Flag and Link bits are bits based on the SCSI specifications. In the case of this embodiment, these bits are set at 0.

When the START STOP UNIT COMMAND is received, the drive 502 starts the rotation of the medium 10 mounted thereon. As the rotation speed of the medium 10 gets stabilized, characteristics of the medium are learned. In this embodiment, a laser power in a read operation, a laser power in a write operation and a position correction value of the servo are learned from the learning process. In an actual drive, more various parameters are learned in order to maintain compatibility among mediums and among drives. As results of learning, parameters used for controlling components in operations to read out and write data from and into a medium are obtained. In the case of this embodiment, however, only a laser power in a read operation, a laser power in a write operation and a position correction value of the servo cited above are obtained as results of learning in order to make the explanation simple. The three values obtained from a learning process are referred to as learning parameters in this specification.

In the drive 502, the servo control circuit S22 moves the optical pickup head 520 to the position of the medium 10 used in the learning process and then the DVD-data processing circuit 530 reads out and writes data from and into the medium 10 in order to obtain learning parameters considered to be appropriate for the medium 10. The drive 502 then stores the learning parameters into the learning-parameter temporary saving area 5922 of the RAM 592. Thereafter, it is possible to execute a request for a read or write operation made by the host computer 99.

Figure 6:
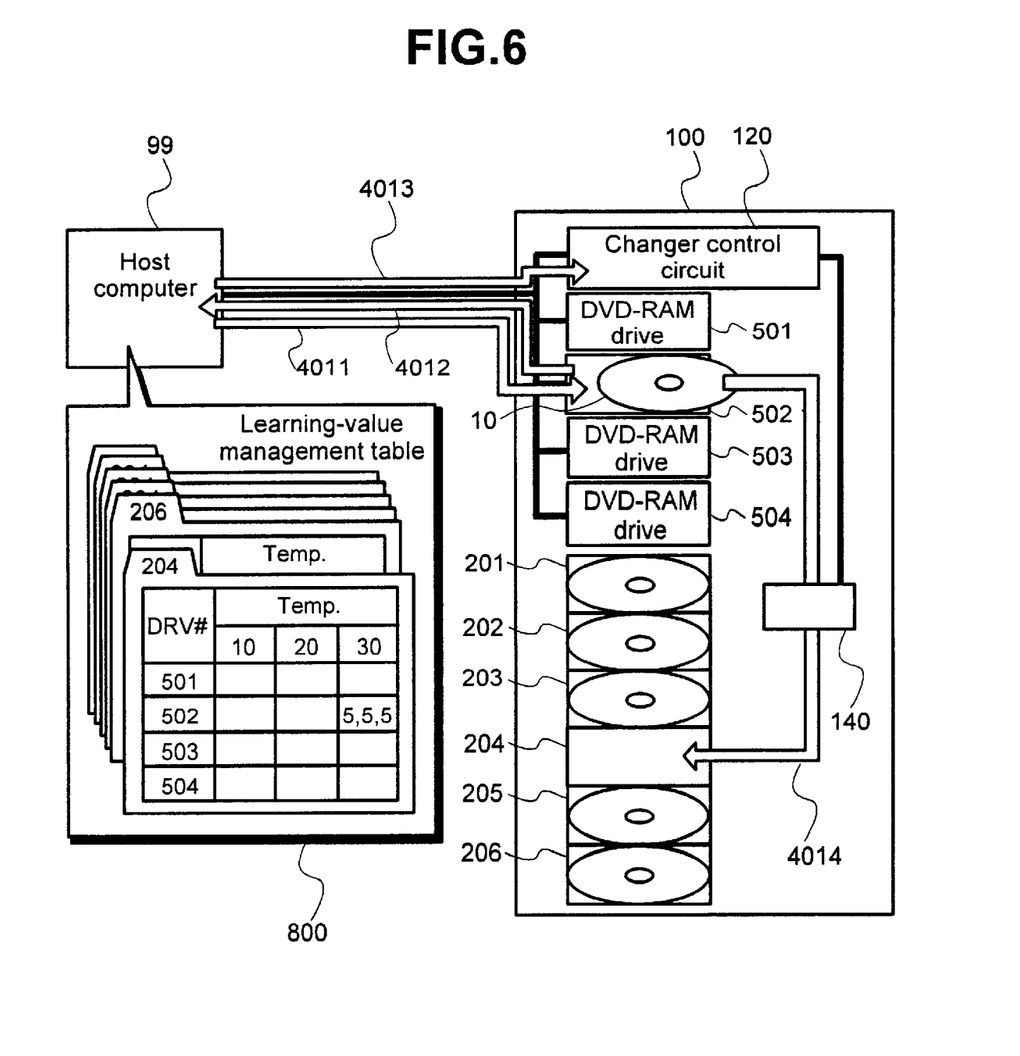
FIG. 6 is a modeling diagram showing a state of demount processing.
Figure 7:
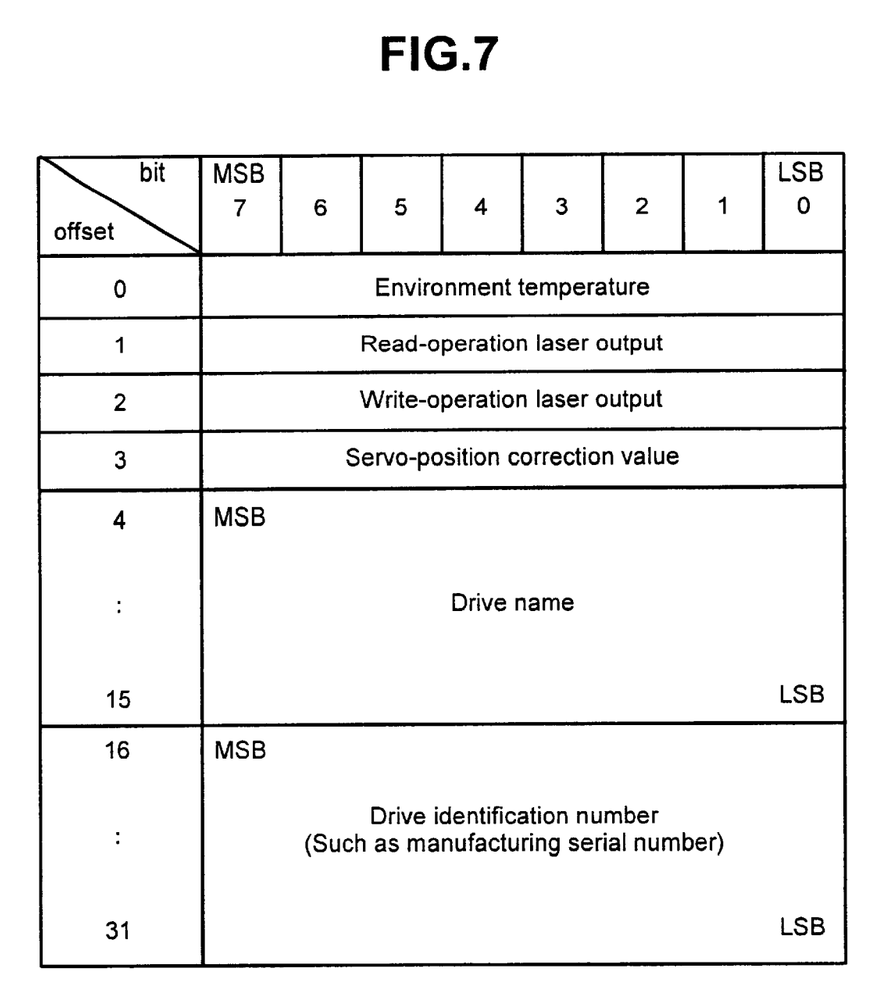
FIG. 7 is a diagram showing the format of learning parameters.

FIG. 6 is a modeling diagram showing a state of demount processing to restore the medium 10 from the drive 502 to the slot 204. The host computer 99 issues a START STOP UNIT COMMAND to the drive 502 to halt the rotation of the medium 10 as shown by an arrow 4011 in the figure, putting the medium 10 in a state of being transportable. The START/STOP bit and the LOAD/EJECT bit in the START STOP UNIT COMMAND are set at 0 and 1 respectively to request that the rotation of the medium 10 be halted. The START UP PARAMETER bit is set at 1 to request the drive 502 that learning parameters be transferred to the host computer 99. Receiving the START STOP UNIT COMMAND, the drive 502 halts the rotation of the spindle motor 510, transferring learning parameters stored in the learning-parameter temporary saving area 5922 of the RAM 592 to the host computer 99 as shown by an arrow 4012 in FIG. 6. FIG. 7 is a diagram showing the format of learning parameters transferred from any of the drives 501 to 504 to the host computer 99. As shown in the figure, the parameters transferred to the host computer 99 also include information such as an environment temperature, a drive name and a drive identification number such as a manufacturing serial number in addition to the laser power in a read operation, the laser power in a write operation and the position correction value of the servo cited above. The host computer 99 keeps the learning parameters received from the drive 502 in the learning-parameter management table 800. Since the learning-parameter management table 800 is stored in a nonvolatile memory in the host computer 99, the parameters remain held in the table 800 even after the power supply of the computer 99 is turned off. After the learning parameters have been stored in the learning-parameter management table 800, the host computer 99 issues a MOVE COM- MAND to the changer control circuit 120 as shown by an arrow 4013, requesting the changer control circuit that the medium 10 be transported from the drive 502 back to the slot 204. Receiving the MOVE COMMAND, the changer control circuit 120 controls the medium transport unit 140 to transport the medium 10 from the drive 502 back to the slot 204 as shown by an arrow 4014.

Figure 8:
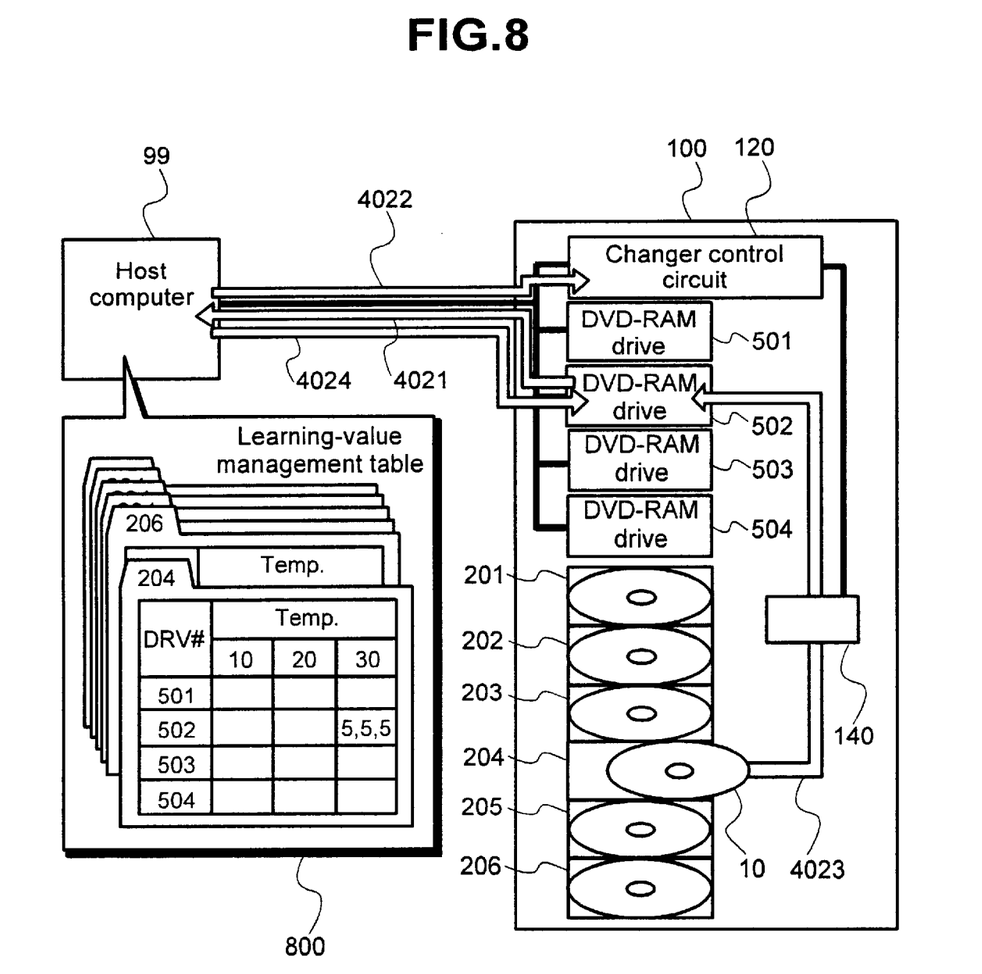
FIG. 8 is a modeling diagram showing a state of mounting processing using learning parameters.

FIG. 8 is a modeling diagram showing a state of mount processing using learning parameters already received by the host computer 99. Before a medium 10 with learning parameters known by the host computer 99 is transported from the slot 204 to the drive 502, first of all, the host computer 99 issues a REPORT TEMPERATURE COMMAND to the drive 502 as shown by an arrow 4021 in order to acquire an environment temperature from the drive 502. The environment temperature acquired from the drive 502 is used as an index to search a two-dimensional matrix of the learning-parameter management table 800 for learning parameters. To put it in detail, the host computer 99 first selects a two-dimensional matrix of the parameter-learning management table 800 for the slot 204. Then, the host computer 99 determines the two-dimensional matrix's row and column corresponding to the drive 502 and the acquired temperature respectively, reading out learning parameters from a cross point of the determined row and column. Assume, that the environment temperature is 30° C. In this case, the laser power in a read operation, the laser power in a write operation and the position correction value of the servo are 5, 5 and 5 respectively as shown in FIG. 8.

In order to actually use the medium 10 with learning parameters known by the host computer 99, the host computer 99 issues a MOVE COMMAND to the changer control circuit 120 as shown by an arrow 4022 to request the medium transport unit 140 to transport a medium 10 from the slot 204 to the drive. In accordance with this MOVE COMMAND and, the changer control circuit 120 controls the medium transport unit 140 to transport the medium 10 from the slot 204 to the drive 502 as shown by an arrow 4023 in the figure. When a status response indicating completion of the execution of the MOVE COMMAND is received from the changer control circuit 120, the host computer 99 issues a START STOP UNIT COMMAND to the drive 502 as shown by an arrow 4024. The START/STOP bit and the LOAD/EJECT bit in the START STOP UNIT COMMAND are both set at 1 to request that rotation be started. The START UP PARAMETER bit is also set at 1 to indicate that learning parameter can be provided by the host computer 99. When the START STOP UNIT COMMAND is received, the drive 502 requests the host computer 99 to transfer learning parameters. In response to this request, the host computer 99 transfers the laser power in a read operation, the laser power in a write operation and the position correction value of the servo read out from the learning-parameter management table 800 for the environment temperature of the drive 502 to the drive 502. These learning parameters are set in offsets 0 to 3 of data transferred by the host computer 99 to the drive 502 with a format shown in FIG. 7. The drive 502 then stores the learning parameters received from the host computer 99 into the learning-parameter temporary saving area 5922 of the RAM 592 before starting the rotation of the medium 10 mounted thereon. As the rotation speed of the medium 10 gets stabilized, the drive 502 is in a state of being capable of accepting a request for a read or write operation made by the host computer 99. As a result, the drive 502 is capable of executing a request for a read or write operation made by the host computer 99 by using the learning parameters received from the computer 99 without the need to carry out a learning process, making it possible to shorten the mount time.

If learning parameters for an environment temperature received from a drive are not available in the learning-parameter management table 800, the learning parameters for the temperature can be inferred from other parameters which have been obtained from a previous learning process and the inferred parameters can then be transferred to the drive. Assume that learning parameters for 10° C. and 30° C., have been stored in the learning-parameter management table 800 but those for 20° C. have not. In this case, if the environment temperature reported by the drive is 20° C., the laser power in a read operation, the laser power in a write operation and the position correction value of the servo for 20° C. are obtained by inference from the learning parameters for 10° C. and 30° C. by using an approximation function and then transferred to the drive. The drive carries out operations to write and read out data into and from a medium 10 by using the learning parameters transferred by the host computer 99. If an operation to write and read out data into and from a medium 10 ends in a failure, the drive performs a learning process.

The host computer 99 is also capable of selecting a drive to receive a medium 10 by referring to the two-dimensional matrixes of the learning-parameter management table 800. Assume that the environment temperature is 30° C. and learning parameters for this temperature have been learned for the drive 504 but have not been learned for the drives 501 to 503. In this case, the drive 504 is selected by the host computer 99, taking precedence of the drives 501 to 503, as a destination drive to receive a medium 10. When the medium 10 is transported to the drive 504, the learning parameters for the environment temperature 20° C. are transferred to the drive 504, allowing the mount time to be shortened. If another medium 10 has been mounted on the drive 504, the host computer 99 selects another drive to which the medium 10 is to be transported. In this case, the mount time is not shortened since learning parameters are not available for the other drive.

In order to eject a medium 10 from the changer apparatus 100 by using the import/export unit 160, the host computer 99 issues a MOVE COMMAND for transporting the medium 10 to be ejected from one of the slots 201 to 206 or one of the drives 501 to 504 to the import/export unit 160 to the changer control circuit 120. Receiving this control command, the changer control circuit 120 controls the medium transport unit 140 to transport a specified medium 10 to the import/export unit 160. When the transportation of the specified medium 10 to the import/export unit 160 is completed, the changer control circuit 120 returns a report of completion of the MOVE COMMAND to the host computer 99. Receiving the report Of completion of the MOVE COMMAND, the host computer 99 clears the learning parameters for the ejected medium 10 from the learning-parameter management table 800. By erasing learning parameters for an ejected medium 10 from the learning-parameter management table 800, it is possible to prevent an obsolete and incorrect learning parameter from being used for a medium different from the ejected one in case the different medium is inserted through the import/export unit 160.

Figure 9:
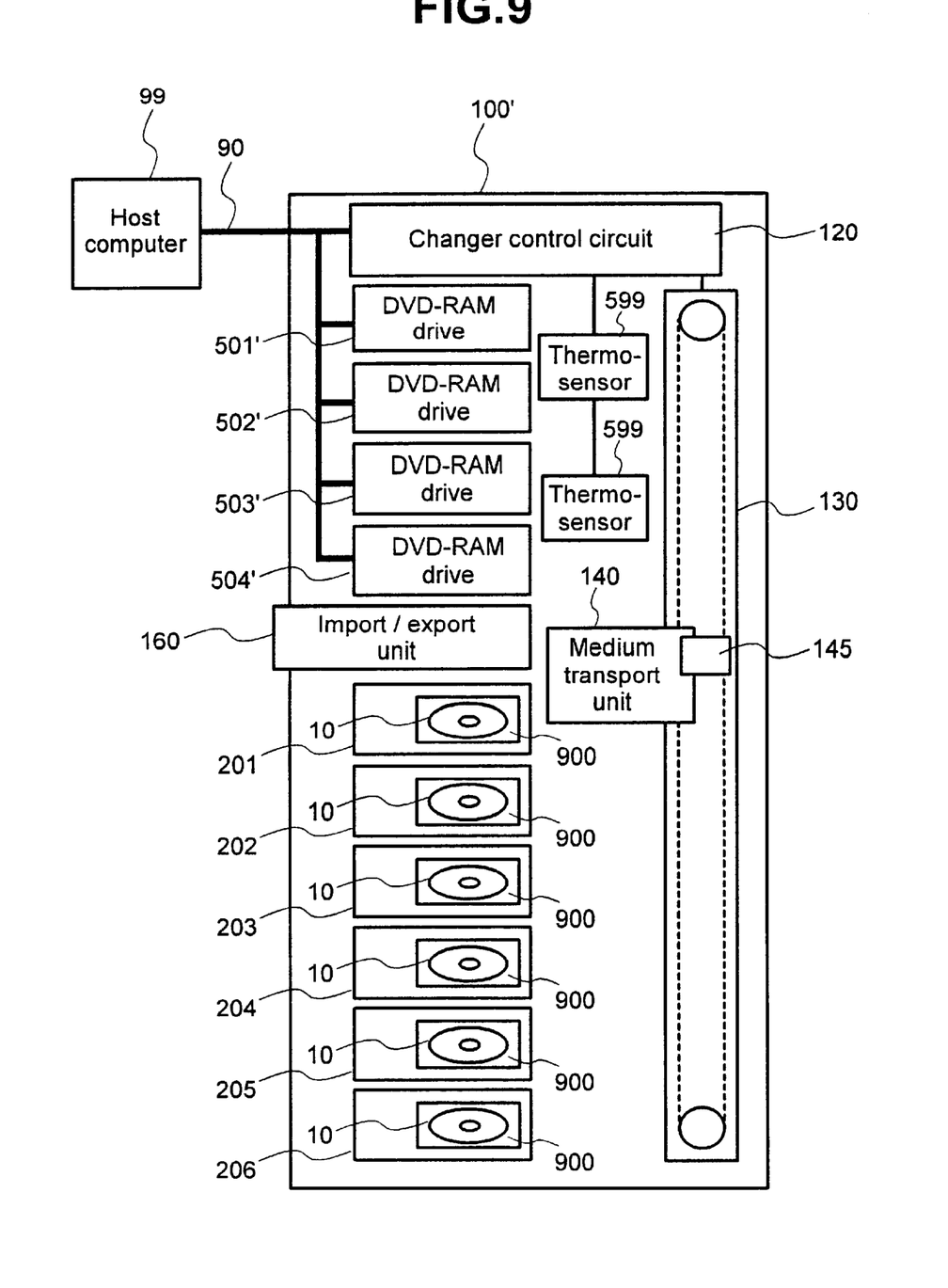
FIG. 9 is a block diagram showing the internal configuration of a changer apparatus implemented by a second embodiment of the present invention.

FIG. 9 is a block diagram showing the internal configuration of a changer apparatus implemented by a second embodiment of the present invention. Drives 501' to 504' shown in the figure are the same as the drives 501 to 504 shown in FIG. 1 except that the drives 501' to 504' do not have a thermo-sensor. However, the changer apparatus 100' has two thermo-sensors 599 close to the drives 501' to 504' as shown in FIG. 9. The thermo-sensors 599 are used for detecting a temperature error so that an environment temperature can be acquired with a higher degree of accuracy. The medium transport unit 140 has a bar-code reader 145. In the case of this embodiment, a learning-parameter management table for holding learning parameters is included in the changer control circuit 120', allowing the changer control circuit 120' to control learning parameters for each medium 10. The learning-parameter management table is the same as the learning-parameter management table 800 used in the first embodiment. In this embodiment, it is not necessary to control learning parameters in the host computer 99 since the learning parameters are controlled in the changer control apparatus 120'.

Figure 10A:
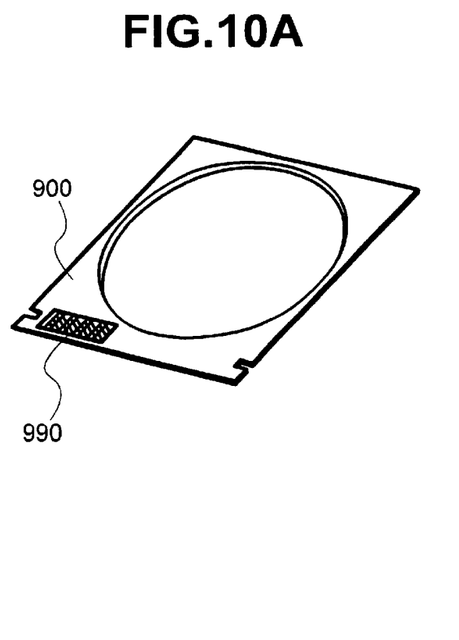
FIGS. 10A and 10B are each a diagram showing an external view of a tray including a medium identification means.

FIG. 10A is a diagram showing an external view of a tray 900 employed in this embodiment. A bar code 990 is pasted on the tray 900. That is to say, the tray 900 has a recorded medium number unique to a medium 10 held by the tray 900. In the course of transportation of the medium 10, the changer control circuit 120' controls the bar-code reader 145 to read the bar code 990 on the tray 900 held by the medium transport unit 140.

The operation of the changer apparatus 100' implemented by this embodiment is explained as follows.

In order to transport a medium 10 from the slot 204 to the drive 502, the host computer 99 issues a MOVE COMMAND for transporting the medium 10 from the slot 204 to the drive 502 to the changer control circuit 120'. In accordance with this MOVE COMMAND, the changer control circuit 120' controls the medium transport unit 140 to transport the medium 10 from the slot 204 to the drive 502. At that time, as the tray 900 is held by the medium transport unit 140, the changer control unit 120' reads out a medium number from the bar code 990. When the transportation of the medium 10 to the drive 502 is completed, the changer control circuit 120' acquires an environment temperature from the thermo-sensors 599. Then, the changer control unit 120' searches the learning-parameter management table 800 for learning parameters associated with the drive number (that is, the number of the drive 502), the medium number read out from the bar code 990 and the environment temperature obtained from the thermo-sensors 599 before a START STOP UNIT COMMAND is issued to the drive 502 to put the medium 10 in a state of allowing data to be read out from and written into. If learning parameters are already available, the START/STOP bit and the LOAD/EJECT bit in the START STOP UNIT COMMAND are both set at 1 to request that rotation be started. In addition, the START UP PARAMETER bit is also set at 1 to indicate that learning parameters can be provided by the changer control unit 120'. If learning parameters are not available yet, on the other hand, the start-up-parameter bit is set at 0 to indicate that no learning parameters can be provided by the changer control unit 120'. In this case, a learning process is carried out by the drive 504 to acquire learning parameters as is the case with the first embodiment. When the operation to mount the medium 10 on the drive 502 is completed, the changer control circuit 120' returns a report of completion of the MOVE COMMAND to the host computer 99.

Figure 10B:
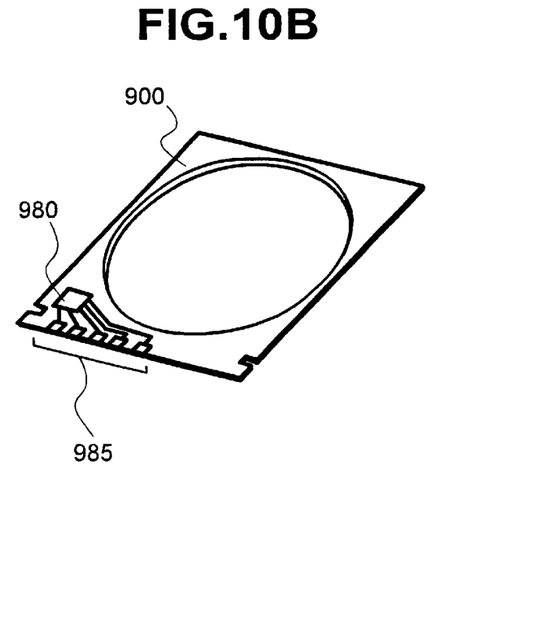

As described above, the embodiment uses a bar code as a medium identification means. It should be noted that, as shown in FIG. 10B, an EEP-ROM (Electrical Erasable Programmable Read Only Memory) 980 can also be provided on the tray 900 as a medium identification means. The EEP-ROM 980 contains medium identification information for identifying a medium 10 held by the tray 900. The EEP-ROM 980 is capable of transferring the medium identification information to and from the outside through a connection pin 985. In the case of an EEP-ROM used as a medium identification means as described above, the medium transport unit 140 is provided with a connection unit for receiving a signal when the connection pin 985 is brought into contact with the connection unit in place of a bar-code reader 145. Since more information can be stored in the EEP-ROM 980 than in the bar code 990, the medium identification information includes not only a medium number but also learning parameters themselves.

Figure 11A:
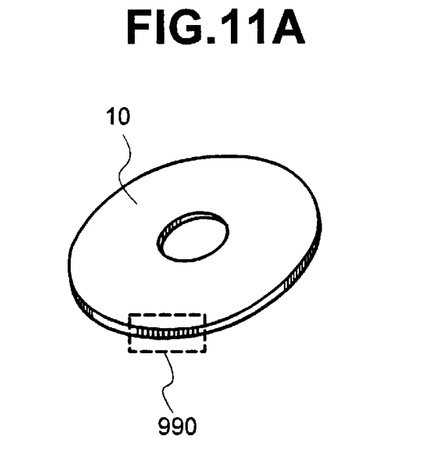
FIGS. 11A and 11B are each a diagram showing an external view of a storage medium including a medium identification means.
Figure 11B:
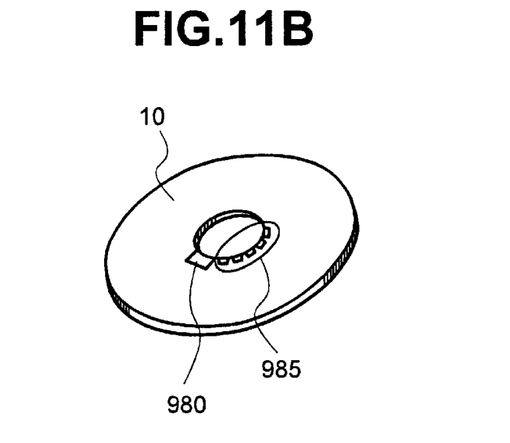

FIGS. 11A and 11B are each a diagram showing an external view of a medium 10 including a medium identification means. As shown in these figures, a medium identification means can be included in a medium 10 itself instead of inclusion in a tray 900. In the case of a medium 10 shown in FIG. 11A, a bar code 990 is printed on a side surface of the circumference of t he medium 10. A medium 10 used in this embodiment has a thickness of 1.2 mm. A bar code 990 printed on a side surface of the circumference of a medium 10 can be read out by the drive while the medium 10 is rotating. In this case, the drive requires a bar-code read circuit dedicated to such a bar code 990. In the case of a medium 10 shown in FIG. 11B, on the other hand, an EEP-ROM 980 is embedded in the innermost circumference of a medium 10. The EEP-ROM 980 is capable of transferring the medium identification information from and to the outside through a connection pin 985 which is also embedded on the innermost circumference of the medium 10.

In the case of this embodiment, since a medium number unique to the medium is recorded on a tray as a bar code, the bar code pasted on the tray can be acquired even after the medium is once ejected from the changer apparatus 100' through the import/export unit 160 and mounted back on the apparatus 100' again. It is thus unnecessary to newly carry out a learning process even if the medium is once ejected from the changer apparatus 100' through the import/export unit 160 and mounted back on the apparatus 100' again. Instead, learning parameters for the acquired medium number can just be obtained from the learning-parameter management table.

Figure 12:
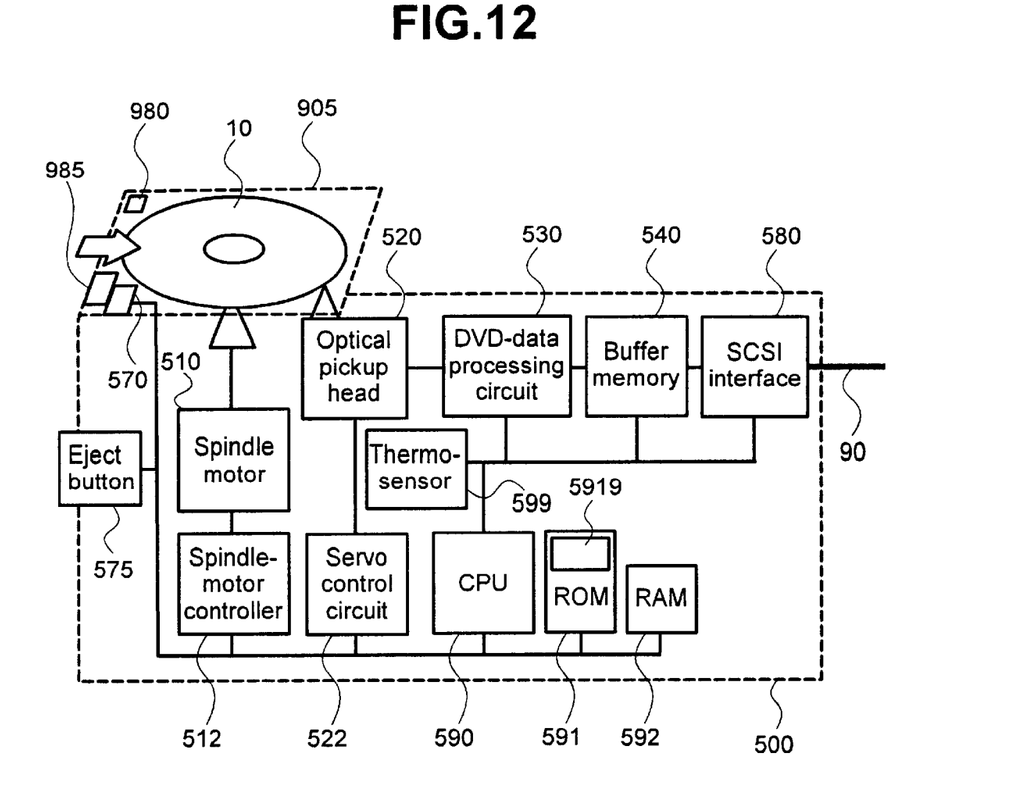
FIG. 12 is a block diagram showing the internal configuration of a drive implemented by a third embodiment of the present invention.
Figure 13:
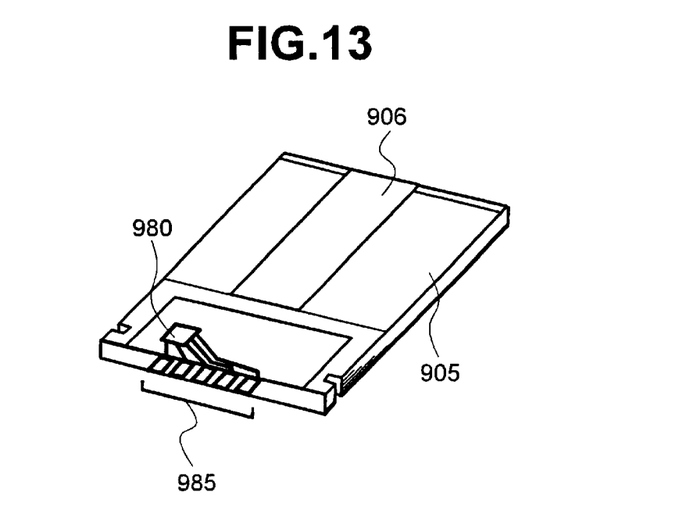
FIG. 13 is a block diagram showing an external view of a cartridge provided with a medium identification means.

FIG. 12 is a block diagram showing the internal configuration of a drive implemented by a third embodiment of the present invention. The drive 500 implemented by the third embodiment has its own function for shortening the mount time. In this embodiment, a medium 10 is mounted on the drive 500 with the medium 10 accommodated in a cartridge 905 as it is. FIG. 13 is a block diagram showing an external view of the cartridge 905 used in the third embodiment. As shown in the figure, the cartridge 905 has a shutter 906 for preventing dirt and dust from being stuck on the medium 10 accommodated in the cartridge 905. The cartridge 905 includes an EEP-ROM 980 which is used for storing a medium number for identifying the medium 10 and a learning-parameter management table for keeping learning parameters.

Refer back to FIG. 12. The drive 500 includes a connection pin 570 and an eject button 575 in addition to the components of the first embodiment shown in FIG. 2. The connection pin 570 is connected to the connection pin 985 of the cartridge 905. The CPU 590 makes an access to the EEP-ROM 980 through the connection pins 570 and 985 to read out learning parameters from the EEP-ROM 980 and write new information into it. The user can remove the cartridge 905 by pressing the eject button 575. A ROM 591 has a drive-number holding area 5919 for storing a number unique to the drive 500. A drive number is a combination of typically a drive type and a manufacturing serial number.

When a cartridge 905 having a medium identification means is mounted on the drive 500, the drive 500 activates a spindle motor 510, putting a medium 10 accommodated in the cartridge 905 in a state of allowing data to be read out from and written into. If the cartridge 905 is seated correctly, the connection pin 985 on the cartridge 905 is brought into contact with the connection pin 570 of the drive 500, allowing the CPU 590 to read out and write learning parameters from and into the EEP-ROM 980. As the medium 10 is put in a readable and writable state, the CPU 590 reads out learning parameters from the learning-parameter management table stored in the EEP-ROM 980 for the drive number held in the drive-number holding area 5919 of the ROM 519 and an environment temperature detected by the thermo-sensor 599. If such learning parameters are not available yet, the CPU 590 carries out a learning process to produce the laser power in a read operation, the laser power in a write operation and a position correction value of the servo before making itself ready to receive read and write requests from the host computer 99. If such learning parameters are already available, on the other hand, the CPU 590 is ready to receive read and write requests from the host computer 99 without performing a learning process.

When the eject button 575 is pressed, the CPU 590 halts the spindle motor 510, returning the optical pickup head 520 to a predetermined position. Then, the CPU 590 29 stores the present learning parameters and the environment temperature into the EEP-ROM 980. The learning parameters which are stored in the EEP-ROM 980 when the cartridge 905 is ejected can be used when the medium 10 and the cartridge 905 are mounted again so that the mount time can be reduced. When the EEP-ROM 980 is found full of many learning parameters at the time an attempt is made to store new learning parameters in the EEP-ROM 980 so that the new learning parameters can no longer be written into the EEP-ROM 980, the CPU 590 deletes some existing learning parameters starting with eldest ones or learning parameters least frequently used to create a space for the new ones.

In this embodiment, if a bar code recording an identification number individually is used as a medium identification means owned by the cartridge 905, a learning-parameter management table is stored in a memory employed in the drive 500. In this case, the learning-parameter management table contains relations between environment temperatures and learning parameters for each medium 10.

Figure 14:
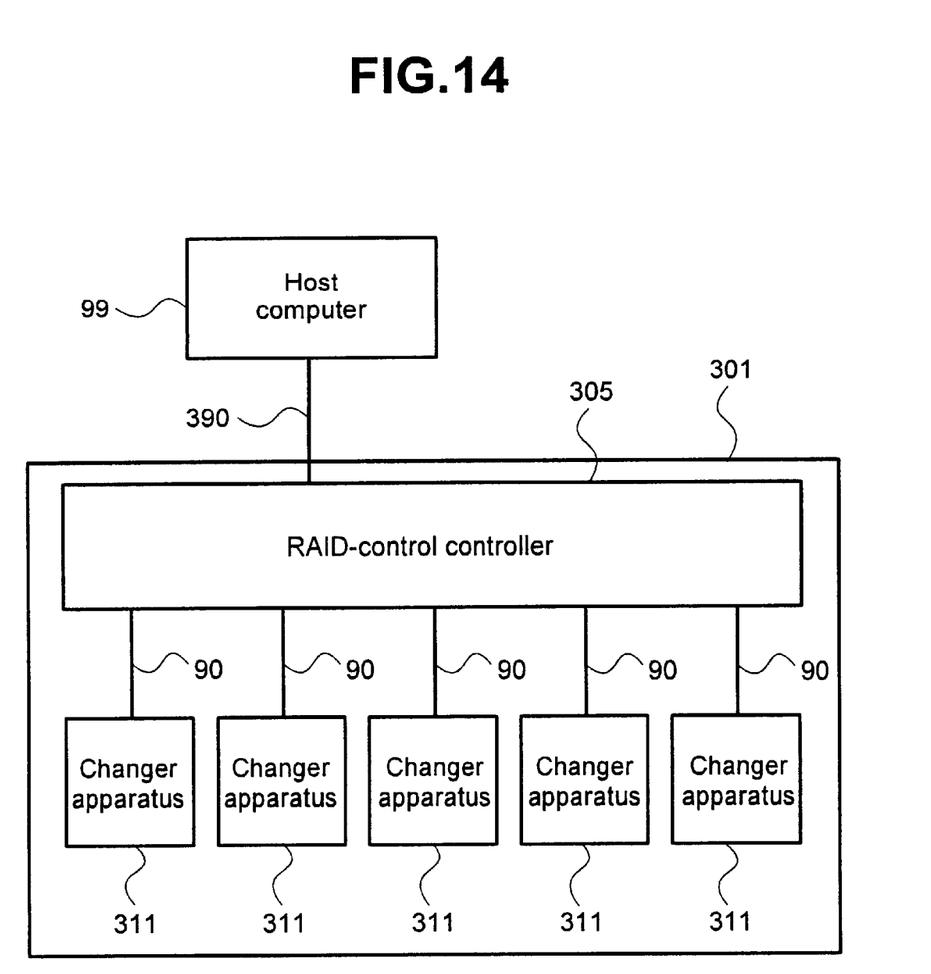
FIG. 14 is a block diagram showing the configuration of a RAID-type storage apparatus utilizing a changer apparatus implemented by a fourth embodiment of the present invention.

FIG. 14 is a block diagram showing the configuration of a RAID (Redundant Arrays of Inexpensive Disks)-type storage apparatus utilizing a changer apparatus implemented by a fourth embodiment of the present invention. A storage apparatus 301 is implemented as a RAID type storage apparatus wherein a plurality of changer apparatuses 311 to 315 are connected to a RAID-control controller 305. The RAID is a control system whereby data is stored and distributed in a plurality of storage apparatuses or redundant data is generated and stored in a storage apparatus so as to realize transfers of data at high speeds and holding of data with a high degree of reliability. The RAID is disclosed in a thesis entitled A Case for Redundant Arrays of Inexpensive Disks (RAID) authored by David A. Patterson, Garth Gibson and Randy H. Katz, Computer Science Division Department of Electrical Engineering and Computer Sciences, University of California Berkeley. This thesis describes a disk array using a plurality of magnetic disc apparatuses as a storage apparatus. Configurations of the RAID disk array apparatus are categorized into 5 levels. In a configuration of RAID level 3, performance improvement can be expected for sequential accesses to transfer a large amount of data while, in a configuration of RAID level 5, performance improvement is expected for random accesses accompanying a large number of operations to read out and write data of small sizes as is generally known. The configuration of each of the changer apparatuses 311 to 315 is the same as the changer apparatus implemented by the first embodiment shown in FIG. 1. The RAID-control controller 305 carries out control of medium transportation in the changer apparatuses 311 to 315, data distribution and collection processing and generation of redundant data. The RAID-control controller 305 includes a learning-parameter management table and controls learning parameters. A fiber channel 390 is used as an interface in the connection between the RAID-control controller 305 and the host computer 100 whereas an SCSI 90 is used as an interface in the connection between the RAID-control controller 305 and the changer apparatuses 311 to 315.

When the host computer 99 requests the RAID-control controller 305 to transport a medium 10 from the slot 204 to the drive 502, the RAID-control controller 305 passes on the request to the changer apparatuses 311 to 315. The changer apparatuses 311 to 315 each transport a medium 10 from its own slot 204 to its own drive 502. When the transportation of a medium 10 in each of the changer apparatuses 311 to 315 is completed, the RAID-control controller 305 issues a REPORT TEMPERATURE COMMAND to the drive 502 in each of the changer apparatuses 311 to 315 in order to acquire an environment temperature from the drive 502. In accordance with the REPORT TEMPERATURE COMMAND, the drive 502 in each of the changer apparatuses 311 to 315 acquires an environment temperature of the drive 502, transferring the environment temperature to the RAID-control controller 305. Subsequently, the RAID-control controller 305 fetches learning parameters of the drive 502 in each of the changer apparatuses 311 to 315 for the environment temperature, the drive number of the drive 502 and the slot number from a learning-parameter management table and then issues a START STOP UNIT COMMAND to the drive 502 to mount a medium 10 and to use the learning parameters. When the drive 502 in each of the changer apparatuses 311 to 315 completes the mount processing, the RAID-control controller 305 reports a transportation completion to the host computer 99. If learning parameters are not available for any of the drives 502, the drives must each carry out a learning process so that the mount time is not shortened.

As described above, by implementing the mount processing using learning parameters in the upper-level system such as a host computer or a RAID-control controller, data can be written into and read out from a medium without the need to carry out a learning process, allowing the mount time to be shortened.

The present invention is not limited to the embodiments described above but can take a variety of implementations defined by the scope of essentials of the invention. To put it concretely, in the embodiments described above, learning parameters are controlled by considering the temperature of an environment in which the drive is operating. If it is not necessary to take effects of the environment temperature into consideration, learning parameters need to be kept and controlled for a combination of a drive and a medium set therein. In addition, instead of providing a thermo-sensor in each drive as is the case with the first embodiment, a thermo-sensor can be provided at a location in close proximity to a plurality of drives as is the case with the second embodiment. In the case of the first and second embodiments, the learning-parameter management table can be configured to contain relations between learning parameters and drives for each medium or relations between learning parameters and mediums for each drive.

As an alternative, in the case of the first embodiment, the learning-parameter management table may be stored in a changer control circuit for controlling learning parameters. In the case of the second embodiment, the learning-parameter management table can be stored in a host computer for controlling learning parameters.

What is claimed is:

1. A storage apparatus comprising a drive unit for writing and reading out data into and from a removable storage medium, said drive unit including:

a processor;

a driving means for rotating said storage medium; and a read/write means for writing data into said storage medium and reading out data from said storage medium, wherein said processor controls operations to write data into said storage medium and read out data from said storage medium in accordance with a parameter obtained from a host computer connected to said storage apparatus said parameter including a set of storage medium ID, drive ID and learning values related to an environment of said drive unit.

2. A storage apparatus according to claim 1 wherein said parameter is determined in accordance with a condition of an environment in which said drive unit is operating.

3. A storage apparatus according to claim 2 wherein said condition is a temperature of an environment in which said drive unit is operating.

4. A storage apparatus according to claim 1 wherein:

said drive unit has a read means for reading out information from said storage medium with said information used for identifying said storage medium from other storage mediums; and said processor receives said information, passing on said information to the outside.

5. A storage apparatus according to claim 1 wherein:

said medium has a storage means for storing relations between a plurality of said drive units and said parameters;

said driving unit has an access means for making an access to said storage means; and said processor makes an access to said storage means through said access means to read out one of said parameters for one of said driving units associated with said processor.

6. A storage apparatus according to claim 1 further comprising:

a plurality of slots for accommodating a plurality of said storage mediums;

a transport unit for transporting said storage mediums between said slots and said drive unit; and a control unit for controlling said transport unit.

7. A storage apparatus according to claim 6 wherein said control unit identifies a particular one of said storage mediums set in said drive unit in accordance with a slot accommodating said particular storage medium.

8. A storage apparatus according to claim 6 wherein:

each of said storage mediums is mounted on a tray having an identification means for recording identification information for individually identifying said storage medium; and said control unit identifies one of said storage mediums mounted on said tray thereof in accordance with identification information read out by a read means provided on said transport unit from said tray.

9. A method for controlling a storage apparatus for storing data to be used by a computer connected to said storage apparatus comprising:

a plurality of slots for accommodating storage mediums;

a drive unit for writing and reading out data into and from said storage mediums set in said drive units;

a transport unit for transporting said storage mediums between said slots and said drive units; and a control unit for controlling transportation of said storage medium by said transport unit, said method comprising the steps of:

issuing a command from said computer to said control unit to transport a particular one of said storage mediums accommodated in one of said slots to said drive unit;

receiving a parameter for controlling operations to read out and write data from and into said particular storage medium from said computer in said drive unit, said parameter including a set of storage medium ID, drive ID and learning values related to an environment of said drive unit; and carrying out said operations to read out and write data from and into said particular storage medium in said driving unit in accordance with said parameter in response to requests for operations to read out and write data from and into said particular storage medium made by said computer.

10. A method for controlling a storage apparatus according to claim 9 wherein said parameter is held by said computer for each of said storage mediums accommodated in said slots.

11. A method for controlling a storage apparatus according to claim 10 further comprising the steps of:

letting said computer identify one of said storage mediums set in said drive unit;

issuing a command to said control unit to handle said identified storage medium which data is to be read out from and written into;

acquiring said one of said parameters kept in the computer; and transferring said acquired parameter to said drive unit.

12. A method for controlling a storage apparatus according to claim 11, said method further comprising the steps of:

carrying out a learning process in said drive unit to find a parameter for said identified storage medium in case said parameter has not been kept in said computer;

transferring said parameter obtained as a result of said learning process to said computer; and keeping said parameter obtained as a result of said learning process in said computer by associating said parameter with said storage medium identified by said computer.

13. A method for controlling a storage apparatus according to claim 10, said method further comprising the steps of:

acquiring identification information for identifying one of said storage mediums set in said drive unit in said storage apparatus;

transferring said acquired identification information from said storage apparatus to said computer;

acquiring one of said parameters kept in said computer for said particular storage medium and said identification information; and transferring said acquired parameter to said drive unit.

14. A method for controlling a storage apparatus according to claim 9 wherein:

said storage apparatus has a plurality of said drive units; and said computer has a table showing combinations of said drive units and said storage mediums accommodated in said slots, said method further comprising the step of transferring a parameter for a particular one of said combinations of said particular storage medium and a particular one of said drive units in which said particular storage medium is set.

15. A method for controlling a storage apparatus according to claim 14, said method further comprising:

carrying out a learning process in said drive unit to find a parameter for said particular combination of said particular storage medium and said particular drive unit in case said parameter has not been kept in said computer;

transferring said parameter obtained as a result of said learning process to said computer; and keeping said parameter obtained as a result of said learning process in said computer by associating said parameter with said particular combination of said particular storage medium and said particular drive unit.

16. A method for controlling a storage apparatus according to claim 12 further comprising:

letting said transport unit eject one of said storage mediums accommodated in one of said slots; and letting said computer delete said kept parameter associated with said ejected storage medium.

* * * * *